Nov. 24, 1964  H. H. WALL, JR  3,158,636
MANUFACTURE OF MIXED ALKYLLEAD COMPOUNDS
Filed Oct. 29, 1963
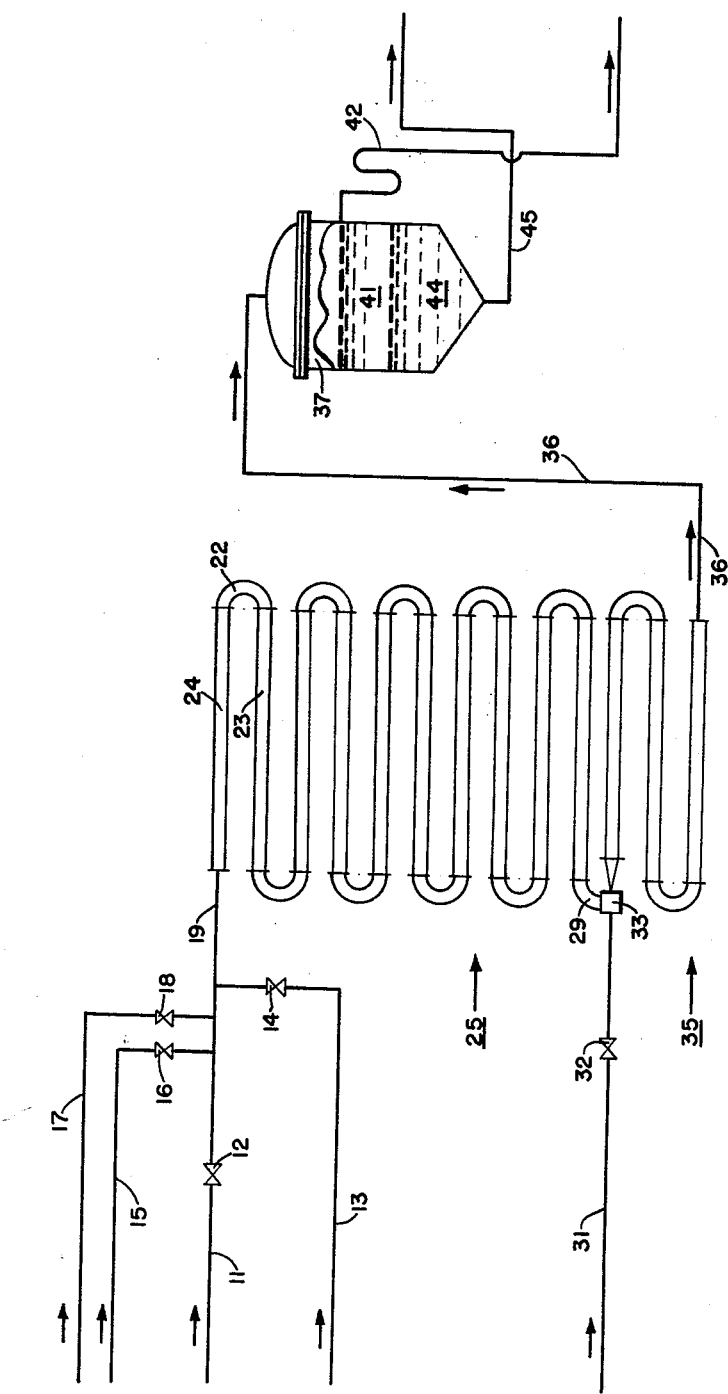

United States Patent Office 3,158,636
Patented Nov. 24, 1964

3,158,636
MANUFACTURE OF MIXED ALKYLLEAD COMPOUNDS
Henry H. Wall, Jr., Baton Rouge, La., assignor to Ethyl Corporation, New York, N.Y., a corporation of Virginia
Filed Oct. 29, 1963, Ser. No. 319,856
7 Claims. (Cl. 260—437)

INTRODUCTION

This invention relates to the redistribution of tetraethyllead and tetramethyllead to obtain a "mixed alkyl" tetraalkyllead product. More particularly, the invention relates to a new and improved technique for accomplishing the interaction of these tetraalkyllead materials in a novel and highly efficient manner.

BACKGROUND AND PROBLEM

It has been known for quite some time that tetraalkyllead compounds can be interreacted to provide a mixture of components wherein the alkyl groups of the original tetraalkyllead constituents are redistributed among the lead atoms to provide a product including substantial amounts of new tetraalkyl compounds wherein the alkyl groups are dissimilar. In other words, considering the case of tetraethyllead and tetramethyllead, it is possible to react these two organometallics to provide a mixture including not only small amounts of the tetraethyllead and tetramethyllead, but quantities of trimethylethyllead, dimethyl diethyllead, and triethylmethyl lead. The present invention is a new and highly expeditious process for accomplishing such a reaction. Difficulties encountered in the past in carrying out this process resulted from the hazardous nature of the reactants and the occurrence of by-product materials in the form of sludge components which required special purification or shut-down operations for cleaning. In addition, it has heretofore been difficult to carry out the reaction under conditions permitting effective redistribution, but at the same time assuring safe and innocuous operation.

The tetraalkyllead compounds are well known as antiknock additives for fuels for internal combustion engines.

OBJECTS

The object of the present invention, then, is to provide a rapid, efficient, and safe process for the redistribution of tetraethyllead and tetramethyllead. A further particular object is to provide a process whereby high production rates can be achieved, but only minor quantities of reactant components are exposed to reaction conditions at any one time. An additional object of the invention is to provide a process wherein the process flows inherently and automatically results in purging of inert gases present in the reaction system at the beginning of an operation, or minor amounts of vapor generated in the process as such. An additional explicit object of the preferred embodiments is to provide a reaction technique wherein the reaction zone in addition to containing only moderate quantities of reactant components, is also self-cleansing, i.e., solvent deposits or sludges formed as a result of the process are efficiently and continuously removed from the reaction zone.

The details of the present invention will be fully understood from the general and detailed description given hereinafter and by reference to the figure, which is a schematic illustration of a typical process layout showing process flows and apparatus.

GENERAL DEFINITION OF THE PROCESS

In its most general form, the process of the invention utilizes as a feed, a mixture, either formed at the feed point or prior thereto, of tetraethyllead, tetramethyllead, and a hydrocarbon inert diluent material. In many embodiments of the invention, the feed also includes halogenated hydrocarbon scavenging compounds, usually desired in the final antiknock mixtures. Surprisingly, these components do not adversely effect the efficiency of the process.

This feed is introduced to an elongated reaction zone having a hydraulic radius from about one-fourth to one inch, preferably three-eighths to three-fourths inch, and including a plurality of horizontal or approximately horizontal sections preferably, but not essentially, arranged in downward, serially arranged sequence, the sections being connected by appropriate cross-overs, such as return bends. Supplementing the reaction zone so-defined is a clean-up zone, similarly having a hydraulic radius of from about one-fourth to one inch, and receiving as its feed the reacted mixture and an aqueous alkaline neutralizing solution, typically sodium hydroxide. In operation, the above defined feed mixture is fed to the inlet to the elongated reaction zone along with a redistribution catalyst of a Group III–A element. Said catalyst includes boron trifluoride catalysts, which can be pure boron trifluoride, $BF_3$, or the etherate thereof. Additional examples of suitable catalysts are aluminum alkyls having from 1 to 4 carbon atoms in each alkyl group and alkyl aluminum chlorides having from 1 to 4 carbon atoms in each alkyl group. The catalysts generally are provided in the proportions giving a concentration of from about 0.005 to about 0.02 atom of the Group III–A element per atom of the lead in the tetraalkyllead components fed. A more preferred range of concentrations is from about 0.006 to 0.015. This concentration, in the case of boron trifluoride is equivalent to a concentration of about 0.2 to 0.5 weight percent of the lead content of the tetraalkyllead components fed.

In passing through the above defined reaction zone, although a short residence time of not over about two minutes is permitted, substantially complete redistribution is readily achieved or alternatively redistribution to the desired level, as is explained hereinafter. As already described, immediately following the extended reaction zone is a neutralizing zone. At the begining of this zone and at the junction of the effluent from the reaction zone, a stream of aqueous alkaline neutralizing material is introduced at a relatively high velocity, such that the static pressure of the mixture immediately thereafter resulting is lower than the static pressure of the reacted mixture contacted at this point. To achieve this result of substantially immediate neutralization of the catalyst components or catalyst residues, a pressure drop of about 20 to about 50 pounds per square inch or higher if desired, is applied to the jet of the neutralizing solution.

DESCRIPTION OF FIGURE

Prior to the working examples, understanding of a typical process installation is desirable. Referring to the figure, it is seen that the principal apparatus installation is an extended conduit reaction zone 25, coupled with a clean-up or neutralization section 35. The reaction zone includes a series of uniform diameter tubular reactor sections joined by return bends. Thus, the first reaction section 24 is joined by return bend 22 to the second reaction section 23, the overall assembly thus providing a plurality of corresponding straight sections arranged in this instance for flow in downward seriatim fashion. The reaction section 25, as noted, is followed by the neutralization section 35. This includes several additional reaction conduit sections, the feed thereto being a jet eductor 33.

The feed lines to the reaction section 25 include a lead alkyl feed line 11, fitted with a control valve 12, and a catalyst feed line 13, provided with a catalyst control valve 14. Supplemental lines 15, 17, each fitted with valves 16, 18, are provided for feed of inert gas or an aqueous washing liquid for occasional clean-up or turn arounds.

The above noted feed lines are manifolded together to a common feed line 19 which joins the first section 24 of the reaction section of the installation.

A line 31 is provided to introduce an aqueous alkali metal alkaline compound, a control valve 32 controlling the amount which is introduced through the eductor 33. Also connected to the eductor 33 is the return bend, or discharge segment 29 from the reactor section 25. Following the neutralization section 35, the contents from this section are passed through a transfer line 36 to a stratifying vessel 37. A bottoms line 45 therefrom is provided for the heavier-than-water organic phase settled out therein, and an aqueous over-flow line 42 is provided to draw off the aqueous phase.

*Example 1*

To illustrate the operation, the following example describes the redistribution of equimolal quantities of tetraethyllead and tetramethyllead according to the present process in the apparatus installation referred to above.

The feed to the reactor section 25 included equimolal proportions of tetramethyllead and tetraethyllead, accompanied by 1,2-dichloroethane and 1,2-dibromoethane in the proportions of one mole of the dichloro compound per mole of tetraalkyllead, plus one-half mole of the dibromoethane per mole of the tetraalkyllead liquid mixture. In addition, the mixture was accompanied by an aromatic diluent amounting to about 20 weight percent of the tetramethyllead content. The diluent was a commercial grade of dry toluene.

This mixture was fed through line 19 to the reactor section 25 along with a catalyst which in this instance is the etherate of boron trifluoride, $BF_3 \cdot (C_2H_5)_2O$, which was fed in proportions providing approximately 0.4 weight percent of boron trifluoride content relative to the lead content of the tetraalkyllead components fed.

The reaction zone in this operation was provided by steel tubes having a hydraulic radius of one-half inch, or sufficient total length to provide a contact time of about one minute at an average lineal velocity of the mixture therein of about two feet per second. The catalyst, fed through line 13, at a rate controlled by valve 14, was a small stream and was continuously introduced to the feed mixture. Reaction was initiated promptly, so that when the reacting system was reached the transfer bend 29, substantially complete redistribution had been achieved at ambient or atmospheric temperatures of 25–30° C. By complete redistribution is meant that the tetraalkyllead components contained individual species approximately corresponding in concentrations and identity to that which would be predicted by statistical analysis, in this instance, the concentrations being as follows:

| Component: | Mole fraction |
|---|---|
| Tetraethyllead | .0625 |
| Triethyl methyllead | .25 |
| Diethyldimethyllead | .375 |
| Ethyltrimethyllead | .25 |
| Tetramethyllead | .0625 |

Concurrently with the passage of the reaction mixture through the transfer bend 29 to the intake of the eductor 33, a two percent sodium hydroxide solution was fed through line 31 and through the central jet of the eductor 33 at a rate providing a pressure drop across the eductor of approximately 40 pounds per square inch, the pressure downstream from the eductor representing a slight drop in pressure in the tubular conduit zones. The aqueous caustic solution was introduced, in proportions of about 50 to 60 weight percent, based upon the tetraalkyllead constituents. This rate of introduction of caustic achieved immediate intimate mixing of the tetraalkyllead-organic phase and the aqueous phase, whereby the fluoride of the catalyst portion of the system was rapidly reacted to result in water soluble sodium fluoride plus minor quantities of by-product lead alkyl hydroxy constituents. The so-mixed stream was transferred through line 36 to the stratification vessel 37, wherein a brief residence time resulted in a clear separation into a bottoms layer 44 including the tetraalkyllead and accompanying organometallic constituents, and an upper aqueous layer 41 including non-reacted sodium hydroxide, sodium fluoride, ether derived from the etherate, in which form the catalyst was provided, and the aforementioned trialkyllead oxide impurity.

The foregoing operation was carried out at ambient temperatures of approximately 30° C. The residence time, as mentioned, was approximately one minute in the reactor section 25, and approximately ten seconds in the clean-up section 35. Conversion to well over 95 percent was accomplished. By conversion is meant attainment of the above given composition of the redistributed products. When necessary, conversions of the order of 110 percent are readily achieved. This means that the concentration of diethyl dimethyl lead is increased appreciably above the indicated concentration, at the expense of the tetramethyllead and tetraethyllead constituent appearing in the product.

As previously indicated, it is not essential to the effectiveness of the process that the said material should be accompanied by halogenated hydrocarbons required or to be present in the final antiknock mixture. As shown in the following example, these can be omitted entirely.

*Example 2*

The operation described in Example 1 is repeated, except that no dichloroethane and dibromoethane are provided in the feed mixture. The reaction zone, in this operation, is an elongated circular cross section zone having a hydraulic radius of three-eights of an inch. Similar prompt and efficient reaction is attained, and the distribution of the tetraalkyllead component is substantially the same as in Example 1.

As an illustration of an operation in which the proportions of tetramethyllead and tetraethyllead interreacted are significantly different, the following example is illustrative.

*Example 3*

In this operation, the feed includes tetramethyllead and tetraethyllead in the molal ratio of 1:3, and the feed is otherwise the same as in Example 1. Again, prompt and efficient reaction is readily attained, the gas initially present in the reaction zone is promptly swept out and the reaction zone is kept purged of gas components, and a product having the following distribution of tetraalkyllead components is achieved:

| Component: | Weight percent |
|---|---|
| Tetraethyllead | 33 |
| Triethylmethyllead | 42 |
| Diethyl dimethyllead | 20 |
| Trimethyl ethyllead | 4.5 |
| Tetramethyllead | 0.5 |

As indicated by the preceding examples, the most common application of the invention is in the redistribution of tetraethyllead and tetramethyllead when these feed components are in unitary molal ratios. Ordinarily, commercial mixtures will not commonly involve either component in starting proportions of less than about one mole to three moles of the other component. In substantially all instances the proportions of the tetraalkyllead feed components are within the range of two-tenths to about eight moles of tetraethyllead per mole of tetramethyllead.

The foregoing examples employ the apparatus shown in the figure, which features downward seriatim sequence arrangement of the reaction conduits. To illustrate a further variation of the process wherein a different specific catalyst is employed and upward flow is used, the following examples are typical.

Example 4

In this operation, the apparatus was similar to that already illustrated, except that the reaction conduit sections have a feed point at the lower-most point and the subsequent neutralization section was the top-most horizontally arranged tube.

A feed mixture consisting of substantially equimolar proportions of tetramethyllead and tetraethyllead, and also having about 8 weight percent toluene and about 22 weight percent ethylene dibromide was fed to the reaction zone. Concurrently, methyl aluminum sesquichloride, dissolved in a 10 weight percent concentration in dichloroethane, was provided at an even rate in the proportions of about 0.22 weight percent of the aforesaid tetraethyllead-tetramethyllead containing feed mixture. This is equivalent to about 0.009 atom aluminum content per atom of lead in the lead alkyls. A residence time of about 1.2 minutes was provided, and a distribution efficiency of about 27 percent was experienced. In other words, the approximate mole fraction of the dimethyl-diethyl lead component of the distributed mixture, based on the tetraalkyllead components, was about eight mole percent.

The neutralizing solution was a 2 weight percent sodium hydroxide solution, provided at a rate corresponding to about two-thirds of the weight rate of the reacted mixture.

Example 5

In this operation, the foregoing procedure was essentially repeated, except that the catalyst concentration was increased to the level of about 0.38 weight percent methyl aluminum sesquichloride, based upon he tetraaalkyllead feed mixture. This corresponds to an aluminum content concentration of about 0.016 per atom of lead of the reacting mixture. Distribution efficiency of 110 percent was obtained in a residence time of 1.25 minutes.

When other alkyl aluminum materials are substituted in the foregoing examples for either the boron trifluoride, or the methyl aluminum sesquichloride illustrated above, similar results are achieved. Exemplary catalysts include trimethyl aluminum, triethyl aluminum, diethyl-n-propyl aluminum, tetra-isobutyl aluminum and tetra-n-butyl aluminum. Other alkyl aluminum chlorides which are highly effective when substituted in corresponding manner include diethyl aluminum chloride, ethyl aluminum sesquichloride, di-n-butyl chloride and others known to the art. When pure boron trifluoride is employed instead of boron trifluoride etherate, similar results are achieved as in the preceding examples.

A particular feature of the present invention is that it provides self purging, that is, the reaction zone is purged of gas present at the start of an operation, or small amounts which are formed during the reaction. This is particularly surprising in the embodiments having successive passes in downward seriatim sequence, but the same benefit is achieved when the flow is upward or successive passes are otherwise arranged. Upon completion of an operation, in the apparatus layout shown by the figure, the reaction section 25 and the neutralization section 35 are drained through a draw-off line, not shown, and the reaction space filled with inert nitrogen supplied through line 15. It is thus apparent, that upon initiating an operation, the reactor section 25 is occupied by gas only. Surprisingly, the present operation results in complete voiding of this gas and displacement thereof by the reacting liquids, even though the flow is, as described for such embodiments, through the several conduit sections downwardly in seriatim fashion. Despite the normal tendency of the gas to rise, the operation results in purging of the reactor zone and substantially complete filling of the reaction space.

Customarily, a circular cross-section reaction zone is preferable because of simplicity and availability of apparatus. However, conduit sections of square, rectangle or oval cross-section, are equally satisfactory, providing that they possess the desired configuration of a hydraulic radius of from about one-fourth to one inch.

The process, as shown by the foregoing examples is rapid and efficient at moderate temperatures of 20 to 40° C. A small amount of heat is released by the reaction and is partly dissipated by radiation through the walls of the reaction zone. The use of an aqueous neutralizing solution immediately following the reaction also provides a direct cooling action to absorb any heat build-up in the reacted mixture.

An important feature of the process is the forcible feed of an aqueous neutralizing solution at the end of the reaction zone under such conditions that the static pressure, immediately at the beginning of the clean-up zones, is less than the static pressure at the terminus of the reaction zone. This is readily accomplished, by feeding the neutralizing solution through an eductor jet under a pressure head of, usually, from about 20 to 50 pounds per square inch. This provides a relatively high velocity to the aqueous solution and induces the relatively low static pressure of the mixed system (reacted mixture with the aqueous phase) immediately past the eductor. Eductor jet sizes of about one-half to one inch are customarily satisfactory.

The identity of the hydrocarbon diluent material, which forms part of the feed, is not highly critical, as long as it is a normally liquid hydrocarbon. Aromatic compounds or mixtures are particularly preferred, but saturated acyclic compounds or streams are also highly effective. Thus, suitable diluents are 2,2,3-trimethyl hexane, o-xylene, a refined saturated paraffinic hydrocarbon cut having a mid-boiling point of about 115° C., or a mixture of ethyl methyl benzenes. When hydrocarbons such as enumerated are substituted for the toluene used in the foregoing examples, and the operations are repeated, similar results are achieved. In most instances, the inert hydrocarbon should be provided in proportions of from about 15 percent by weight of the tetramethyllead component, up to, usually about 30 weight percent. Higher concentrations are not detrimental, but serve no significant purpose, as the aforementioned proportions greatly increase the stability of the tetramethyllead component. In addition, minor quantities of known thermal stabilizers for the tetraethyllead are frequently provided.

This application is a continuation-in-part of my application Serial No. 183,646 filed March 29, 1962 and now abandoned.

I claim:

1. The improved process for the manufacture of a mixed alkyl-tetraalkyllead product comprising reacting a mixture comprising tetraethyllead, tetramethyllead and and an inert liquid diluent hydrocarbon in proportions of from about 15 to about 30 weight percent based upon the tetramethyllead, and a group III–A element catalyst selected from the group consisting of boron trifluoride, aluminum trialkyls having from 1 to 4 carbon atoms in each alkyl group and alkyl aluminum chlorides having from 1 to 4 carbon atoms in each alkyl groups, said group III–A element catalyst being in proportions providing about 0.005 to about 0.02 atom of III–A element per atom of the lead of the tetraalkyllead components fed, the tetraethyllead being in the proportions of from about 0.2 to 8 moles per mole of tetramethyllead, said reaction mixture being reacted in an elongated flow stream in a series of successive horizontal segments connected by return bends, and having a hydraulic radius of from about one-fourth to one inch, for a total reaction period of not more than about two minutes, and then injecting an alkali metal hydroxide aqueous solution at the beginning of a treating segment, the injection being at a sufficiently high velocity to provide a decrease in the static pressure of the mixture, whereby the catalyst component is substantially immediately neutralized, and the settling the so-treated reacted mixture in a settling zone and stratifying into an organolead-organic phase and an aqueous phase.

2. The process of claim 1 further defined in that the successive horizontal segments of the elongated flow stream are in an upward seriatim arrangement, and the group III-A element catalyst is in the proportions of about 0.006 to 0.015 atom per atom of the lead of the tetraalkyllead components feed.

3. The process of claim 1 further defined in that the successive horizontal segments of the elongated flow stream are in a downward seriatim arrangement, and the group III-A element catalyst is in the proportions of about 0.006 to 0.015 atom per atom of the lead of the tetraalkyllead components feed.

4. The process of claim 3 further defined in that the catalyst is a boron trifluoride catalyst, the reaction is carried out in a zone having a hydraulic radius of from three-eighths to three-fourths inch, the inert hydrocarbon diluent is toluene, and the feed includes dihalogenated hydrocarbons in proportions of about 1 to 2 moles per mole of the alkyllead feed.

5. The process of claim 4 further defined in that the feed includes tetraethyllead and tetramethyllead in equimolar proportions.

6. The process of claim 3 further defined in that the catalyst is methyl aluminum sesquichloride, the reaction is carried out in a zone having a hydraulic radius of from three-eighths to three-fourths inch, the inert hydrocarbon diluent is toluene, and the feed includes diahalogenated hydrocarbons in proportions of about 1 to 2 moles per mole of the alkyllead feed.

7. The process of claim 6 further defined in that the feed includes tetraethyllead and tetramethyllead in equimolar proportions.

No references cited.